(12) United States Patent
Cole

(10) Patent No.: US 6,543,568 B2
(45) Date of Patent: Apr. 8, 2003

(54) DUAL VARIABLE-TOOTH RACK AND SINGLE PINION STEERING SYSTEM

(75) Inventor: Michael James Cole, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/865,658

(22) Filed: May 25, 2001

(65) Prior Publication Data

US 2002/0175019 A1 Nov. 28, 2002

(51) Int. Cl.$^7$ ................................................ B62D 3/00
(52) U.S. Cl. .................. 180/428; 180/443; 280/93.514; 74/422; 74/498; 74/89.17
(58) Field of Search ....................... 74/422, 498, 89.17; 280/93.514, 93.513; 180/428, 443, 444

(56) References Cited

U.S. PATENT DOCUMENTS 2,957,361 A * 10/1960 Herbenar
3,972,379 A * 8/1976 Norris ........................ 180/46
4,444,145 A * 4/1984 Kohl ........................ 114/163
5,002,142 A * 3/1991 Klosterhaus ............... 180/79.1
5,687,811 A * 11/1997 Shimizu .................... 180/447
5,860,323 A * 1/1999 Mizutani et al. ............. 74/422
2001/0029796 A1 * 10/2001 Magaribuchi .............. 74/89.17

FOREIGN PATENT DOCUMENTS

| JP | 5-310138 | * 11/1993 |
| JP | 2001-106102 | * 4/2001 |

* cited by examiner

Primary Examiner—Avraham Lerner
(74) Attorney, Agent, or Firm—Edmund P. Anderson

(57) ABSTRACT

A dual variable-tooth rack and single pinion steering system includes a first elongated rack having an inner end, an outer end, and a set of teeth with a predetermined variable tooth profile located between its ends, a second elongated rack having an inner end, an outer end, and a set of teeth with a predetermined variable tooth profile located between its ends; and a pinion disposed to engage the inner end of the first rack and the inner end of the second rack to thereby define a set of rack displacements between the outer end of the first rack and the outer end of the second rack.

13 Claims, 7 Drawing Sheets

US 6,543,568 B2

DUAL VARIABLE-TOOTH RACK AND SINGLE PINION STEERING SYSTEM

TECHNICAL FIELD

This disclosure relates to rack-and-pinion steering systems, and more particularly relates to rack-and-pinion steering systems having dual racks.

BACKGROUND

In conventional steering systems, the operator controls the travel direction of the vehicle with the aid of a steering wheel. This steering wheel is mechanically connected, usually through a gear assembly, to the road wheels. To aid the operator, many systems utilize an auxiliary system to generate an additional force that is transmitted to a steering gear assembly. The additional force reduces the effort required by the operator in adjusting the travel direction of the vehicle. Typically, this auxiliary force is generated by either a hydraulic drive or an electric motor.

Because the steering wheel is connected directly to the road wheels, the resulting mechanical assembly that provides the connection can be quite bulky, complicated and expensive to produce. Therefore, it is desirable to provide a steering system that is less bulky, complicated and expensive than a conventional mechanical system while still providing similar benefits to the operator.

It is often beneficial to change the steering angle of one road wheel at a rate different from that of the other road wheel. Although a steering system employing two separate road wheel actuators is not restricted to turning both wheels at the same rate, it is desirable to develop a steering system needing only a single actuator that also permits differing angles between the two steered road wheels. In addition, it is desirable that such a unit act directly on the steered wheels without incurring an inefficient mechanical disadvantage or bulky packaging disadvantage due to extended Ackerman-type steering arms.

SUMMARY

The above discussed and other drawbacks and deficiencies of the prior art are overcome or alleviated by a dual variable-tooth rack and single pinion steering system. In an exemplary embodiment, a dual variable-tooth rack and single pinion steering system includes a first elongated rack having an inner end, an outer end, and a set of teeth with a predetermined variable tooth profile located between its ends; and a second elongated rack having an inner end, an outer end, and a set of teeth with a predetermined variable tooth profile located between its ends. In addition, the steering system has a pinion disposed to engage the inner end of the first rack and the inner end of the second rack. A set of rack displacements is thereby defined between the outer end of the first rack and the outer end of the second rack that corresponds to a set of variable steering angles between a pair of steered wheels.

BRIEF DESCRIPTION OF THE DRAWINGS

Referring to the exemplary drawings wherein like elements are numbered alike in the several Figures.

DESCRIPTION OF EXEMPLARY EMBODIMENTS

Figure 1:
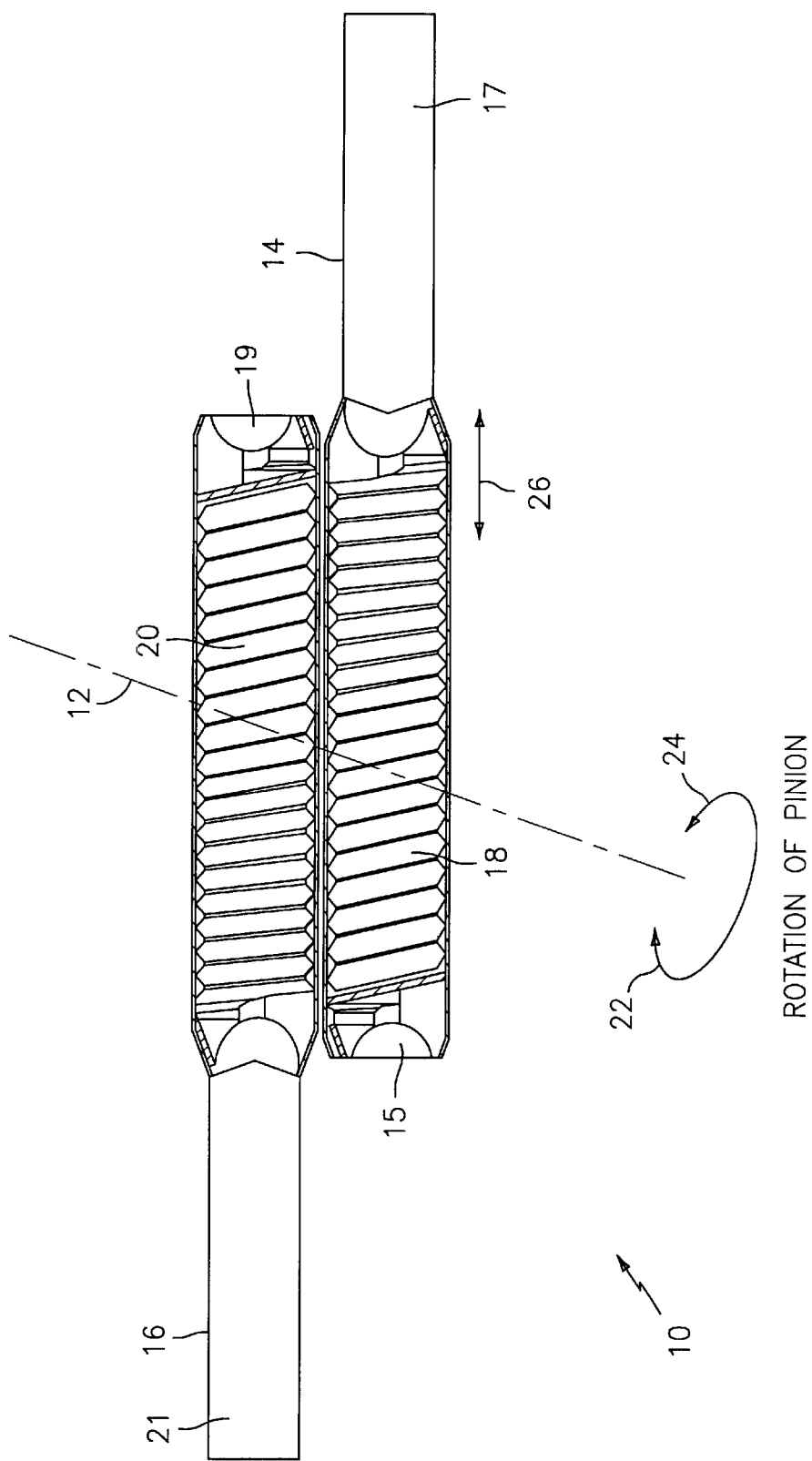
FIG. 1 is a schematic diagram of a first embodiment dual variable-tooth steering rack.

Referring to FIG. 1, reference numeral 10 generally designates a dual variable-tooth rack with a single pinion steering actuator suitable for implementation of a dual variable-tooth rack and single pinion steering system.

A pinion center-line 12 is where an actuator (not shown) exerts a movement such as by a set of torques upon a first elongated variable-tooth rack 14 having a first end 15, and a second end 17. The actuator also exerts a movement, including a second set of torques, upon a second elongated variable-tooth rack 16. The second toothed rack 16 includes a first end 19 and a second end 21. The first toothed rack 14 comprises a first set of rack teeth 18 substantially located within the first end 15, with a first predetermined orientation for each tooth. Similarly, the second toothed rack 16 comprises a second set of rack teeth 20 substantially located within the first end 19, with a second predetermined orientation for each tooth. A set of torques including the first and second sets of torques is further divided into a set of clockwise torques 22 and a set of counter-clockwise torques 24. The set of clockwise torques 22 translates into a set of forces originating from the actuator, which is coupled via the pinion center-line 12 to both the first toothed rack 14 and the second toothed rack 16. In other words, the set of clockwise torques 22 translates into a first set of translational movements such that the first rack 14 moves relative to the pinion center-line 12 at a first rate, and the second rack 16 moves relative to the pinion center-line 12 at a second rate. The relative movement 26 of the first rack 14 relative to that of the second rack 16 causes a first set of forces that act upon elements, such as wheels of a vehicle (not shown), that are coupled to the first rack 14 and the second rack 16. Similarly, the set of counter-clockwise torques 24 translates into a second set of forces originating from the actuator, which is coupled via the pinion center-line 12 to both the first toothed rack 14 and the second toothed rack 16. In other words, the set of counter-clockwise torques 24 translates into a second set of translational movements such that the first rack 14 moves relative to that of the second rack 16. The relative movements 26 of the first rack 14 to those of the second rack 16 cause a set of forces that are exerted upon elements that are coupled to the first rack 14 and the second rack 16. The first set of rack teeth 18 has a tooth profile that changes a set of relative distances between adjacent teeth of the first rack 14. Similarly, the second set of rack teeth 20 has a tooth profile that changes a set of relative distances between adjacent teeth of the second rack 16. In other words, each rack, that is the first rack 14 and the second rack 16, has a translational rate of movement or displacement relative to the pinion center-line 12 for a given pinion rotation, for example in RPM.

Figure 2:
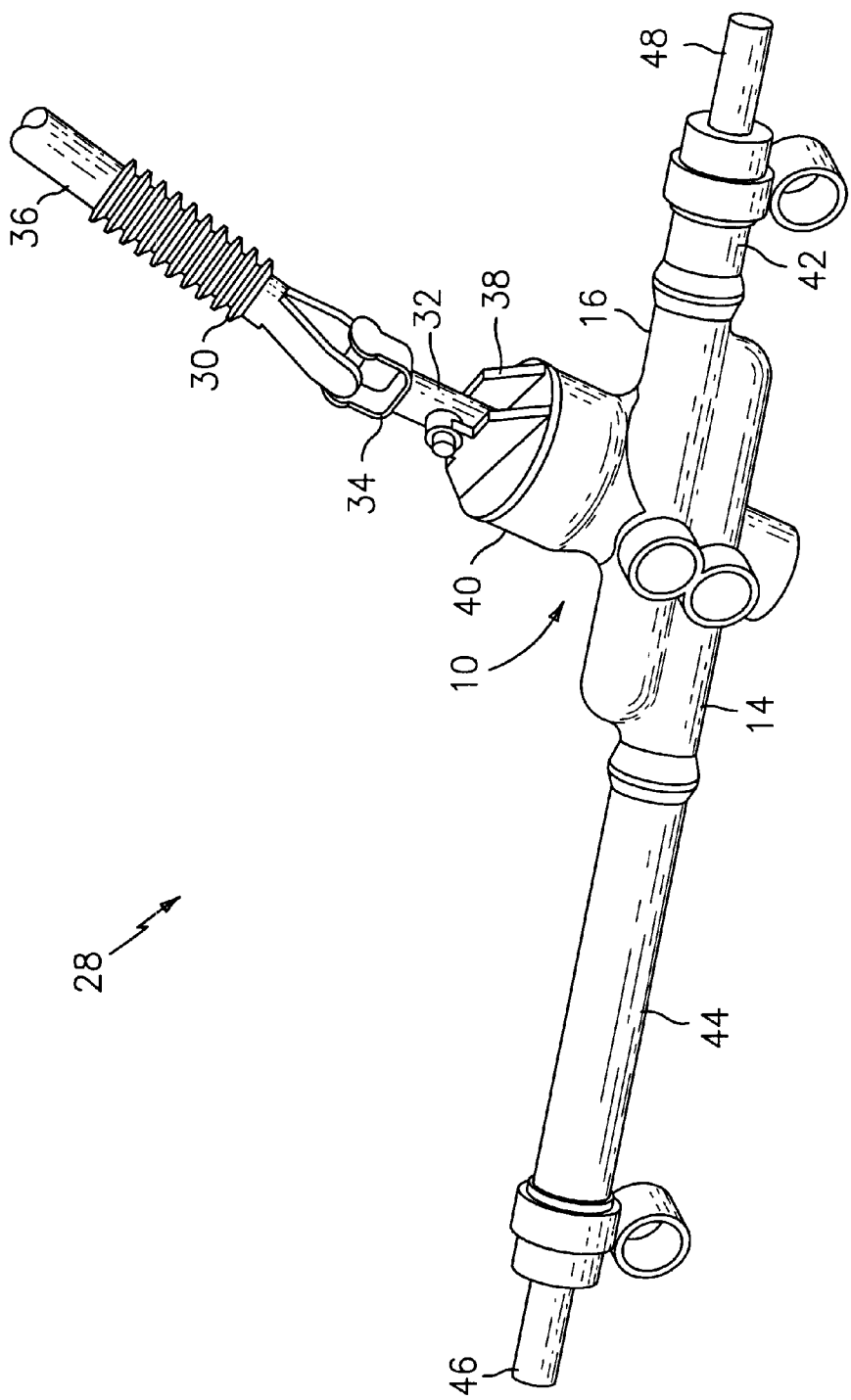
FIG. 2 is a perspective view of the steering rack of FIG. 1.

Turning to FIG. 2, a first embodiment of the dual variable-tooth rack and single pinion steering system 28 is depicted. An operator input 30 that is coupled to a steering force such as provided by a vehicle operator (not shown) turning a steering wheel (also not shown) manually is described. A shaft, having a first end 34 connected to a steering shaft 36 and a second end 38 connected to a pinion gear piece 40, has the pinion center-line 12. The pinion gear piece 40 in turn is coupled to the dual variable-tooth rack 10. Note that the dual variable-tooth rack and single pinion steering system teaches a single pinion steering actuator such as the above described pinion gear piece that drives the dual variable-tooth rack 10. This is a significant feature of the system. The dual variable-tooth rack 10 in turn is coupled to the first rack 14 and the second rack 16. The first embodiment of the dual variable-tooth rack and single pinion steering system 28 has a vehicle operator's side rack area 42 wherein the vehicle operator's side rack area 42 is situated closer to the vehicle operator. In addition, the first system 28 has a passenger side rack area 44. The first rack 14 extends substantially through the passenger side rack area 44 and then is coupled to a front passenger side tie rod 46. The front passenger side tie rod 46 in turn is coupled to a front wheel (not shown). The second rack 16 extends substantially through the vehicle operators side rack area 42 and then is coupled to a front vehicle operator's side tie rod 48. The front vehicle operator's side tie rod 48 in turn is coupled to another front wheel (also not shown).

Figure 3:
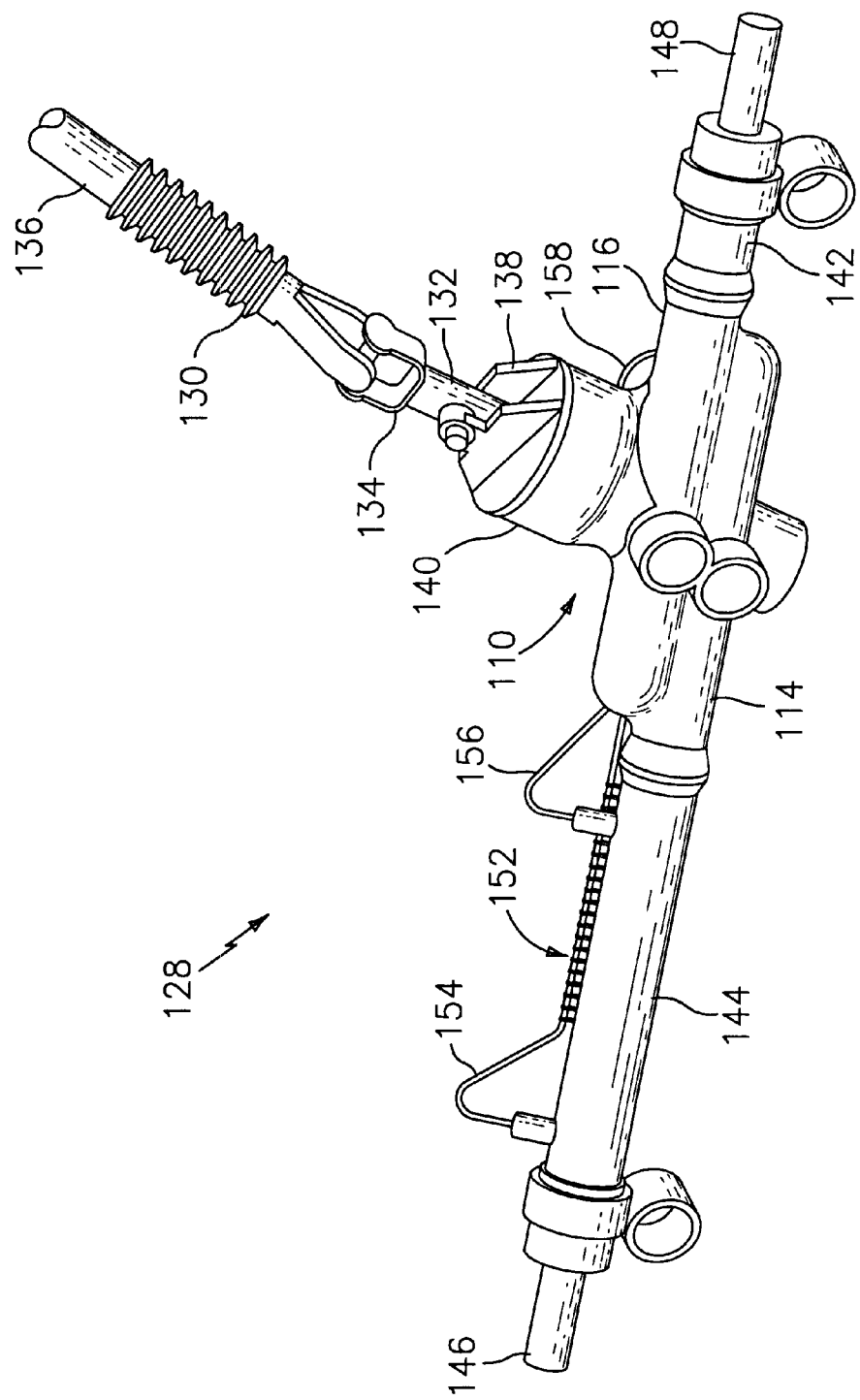
FIG. 3 is a perspective view of a second embodiment dual variable-tooth steering rack.

Referring to FIG. 3, a second embodiment dual variable-tooth rack and single pinion steering system 128 is depicted. An operator input 130 that is coupled to a steering force such as provided by a vehicle operator (not shown) turning a steering wheel (also not shown) manually is described. A shaft, having a first end 134 connected to a steering shaft 136 and a second end 138 connected to a pinion gear piece 140, has the pinion center-line 112. The pinion gear piece 140 in turn is coupled to the dual variable-tooth rack 110. The dual variable-tooth rack and single pinion steering system has a single pinion steering actuator such as the above described pinion gear piece that drives the dual variable-tooth rack 110. This is a significant feature of the system. The dual variable-tooth rack 110, in turn, is coupled to the first rack 114 and the second rack 116. The second embodiment dual variable-tooth rack and single pinion steering system 128 has a vehicle operators side rack area 142 wherein the vehicle operators side rack area 142 is situated closer to the vehicle operator. In addition, the dual variable-tooth rack and single pinion steering system 128 has a passenger side rack area 144. The first rack 114 extends substantially through the passenger side rack area 144 and then is coupled to a front passenger side tie rod 146. The front passenger side tie rod 146 in turn is coupled to a front wheel (not shown). The second rack 116 extends substantially through the vehicle operators side rack area 142 and then is coupled to a front vehicle operator's side tie rod 148. The front vehicle operator's side tie rod 148 in turn is coupled to another front wheel (also not shown). In addition, a hydraulic assist area 152 is described. The hydraulic assist area 152 includes mechanisms for hydraulic power steering that is generally known in the art. The hydraulic assist area 152 includes control valves 154, 156, 158 that are coupled to the pinion gear piece 140 via hydraulic coupling for control purposes.

Figure 4:
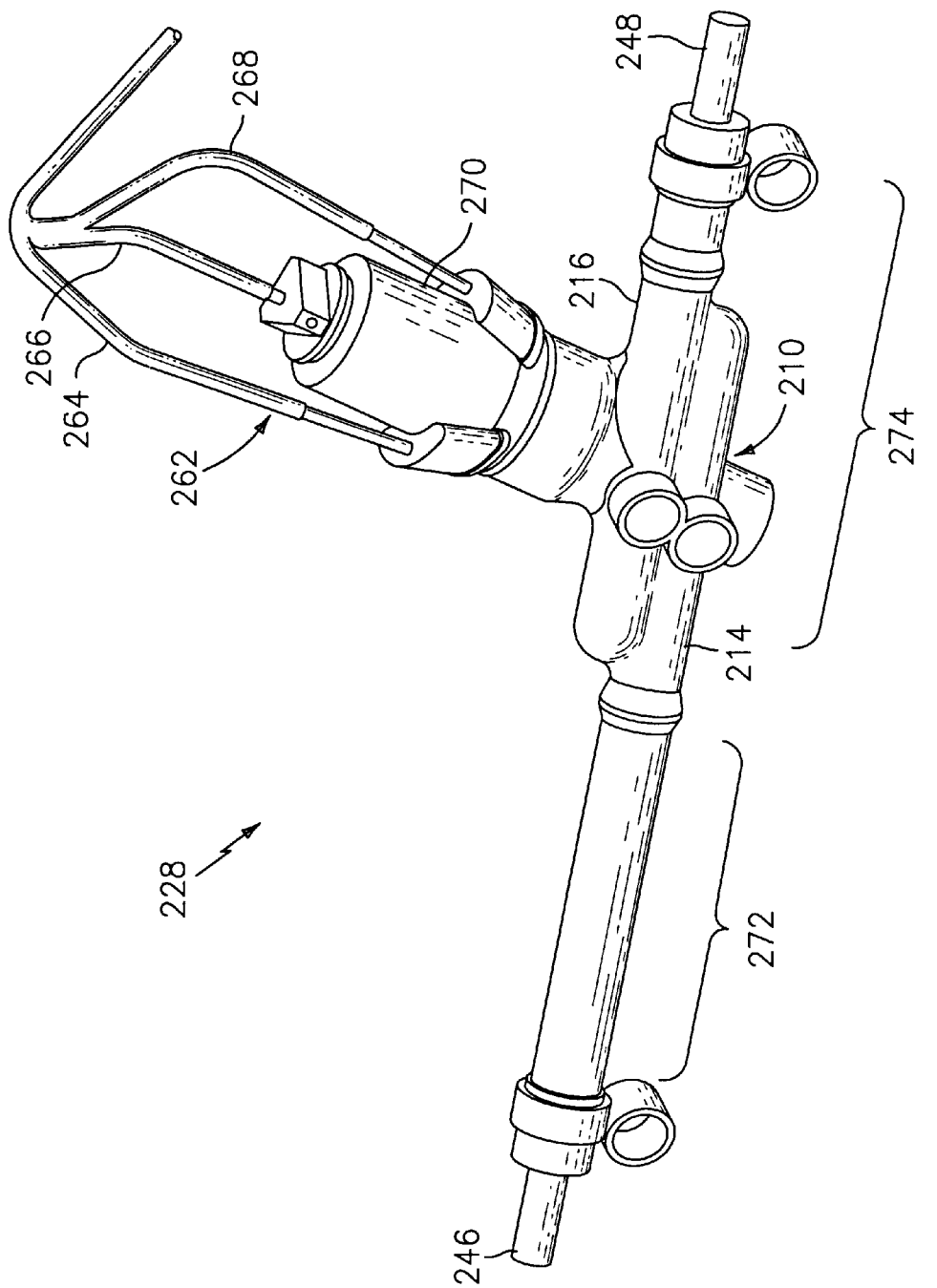
FIG. 4 is a perspective view of a third embodiment dual variable-tooth steering rack.

Referring to FIG. 4, a third embodiment dual variable-tooth rack and single pinion steering system is indicated generally by the reference numeral 228. A primary electric motor drive area 262 is coupled to an electric driving force such as a vehicle battery (not shown) to supply an electric current. The primary electric motor drive area 262 includes a set of electric leads 264, 266, 268 coupled to an electric machine 270 such as an electric motor. The electric machine 270 includes a rotor (not shown) that is coupled to a shaft (also not shown). The shaft in turn is coupled the pinion gear piece 240 that has the pinion centerline 212. The pinion gear piece 240 in turn is coupled to the dual variable-tooth rack 210. The dual variable-tooth rack 210 in turn is coupled to the first rack 214 and the second rack 216. The system 228 has a vehicle operator's side rack area 242 wherein the vehicle operator's side rack area 242 is situated closer to the vehicle operator. The first rack 214 extends substantially through a first side rack area 272 and then is coupled to a front passenger side tie rod 246. The front passenger side tie rod 246 in turn is coupled to a front wheel (not shown). The second rack 216 extends substantially through a second rack area 274 and then is coupled to a front vehicle operator's side tie rod 248. The tie rod 248 in turn is coupled to another front wheel (also not shown). It is noted to describe the instant Figure as the first side rack area 272 and the second side rack area 274 instead of vehicle operator side and passenger side is because in steer-by-wire systems, which are contemplated within the scope of the present disclosure, steering columns are no long needed. In other words, the primary electric motor drive area 262 is at a location as described in the instant figure. Alternatively, the primary electric motor drive area 262 can be elsewhere.

Figure 5:
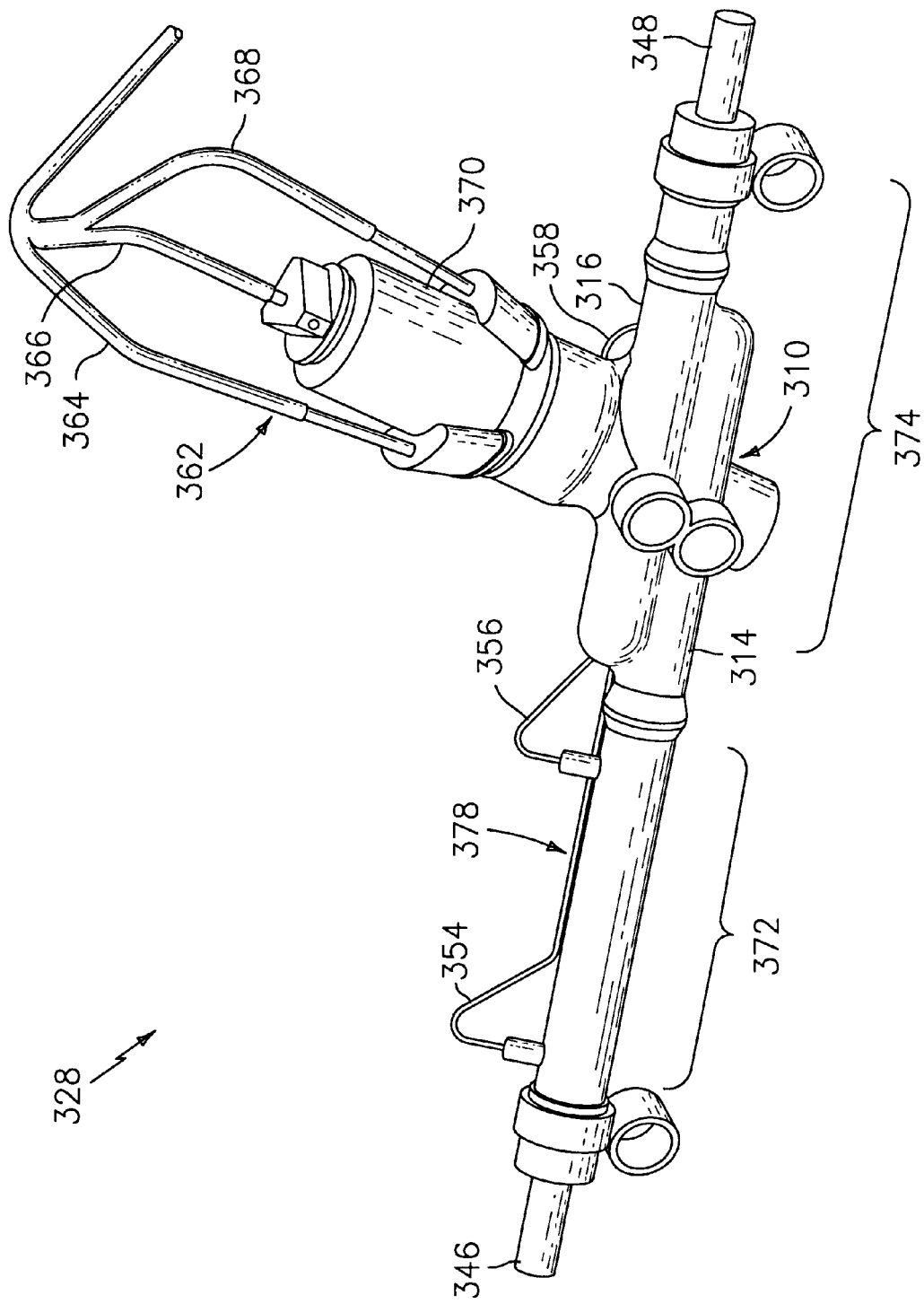
FIG. 5 is a perspective view of a fourth embodiment dual variable-tooth steering rack.

Referring to FIG. 5, a fourth embodiment dual variable-tooth rack and single pinion steering system 328 is depicted. A primary electric motor drive area 362 that is coupled to an electric driving force such as a vehicle battery (not shown) supplying an electric direct current is described. The primary electric motor drive area 362 includes a set of electric leads 364, 366, 368 coupled to an electric machine 370 such as an electric motor. The electric machine 370 includes a rotor (not shown) that is coupled to a shaft (also not shown). The shaft in turn is coupled the pinion gear piece 340 that has the pinion center-line 312. The pinion gear piece 340 in turn is coupled to the dual variable-tooth rack 310. The dual variable-tooth rack 310 in turn is coupled to the first rack 314 and the second rack 316. The fourth embodiment dual variable-tooth rack and single pinion steering system 328 has a vehicle operators side rack area 342 wherein the vehicle operators side rack area 342 is situated closer to the vehicle operator. The first rack 314 extends substantially through a first side rack area 372 and then is coupled to a front passenger side tie rod 346. The front passenger side tie rod 46 in turn is coupled to a front wheel (not shown). The second rack 316 extends substantially through a second rack area 74 and then is coupled to a front vehicle operator's side tie rod 348. The tie rod 348 in turn is coupled to another front wheel (also not shown). It is noted to describe the instant Figure as the first side rack area 372 and the second side rack area 374 instead of vehicle operator side and passenger side is because in steer-by-wire systems, which are contemplated in this disclosure, steering columns are no longer needed. In other words, the primary electric motor drive area 362 is at a location as described in the instant figure. But alternatively, the primary electric motor drive area 362 can be elsewhere. In addition, a hydraulic backup area 378 is described. The hydraulic backup area 378 includes a subsystem for hydraulic power steering that is generally known in the art. The hydraulic backup area 378 includes control valves 354, 356, 358 that are coupled to the pinion gear piece 340 via hydraulic coupling for control purposes. It is pointed out the pinion gear piece 340 in turn is controlled by primary electric motor drive area 362.

Figure 6:
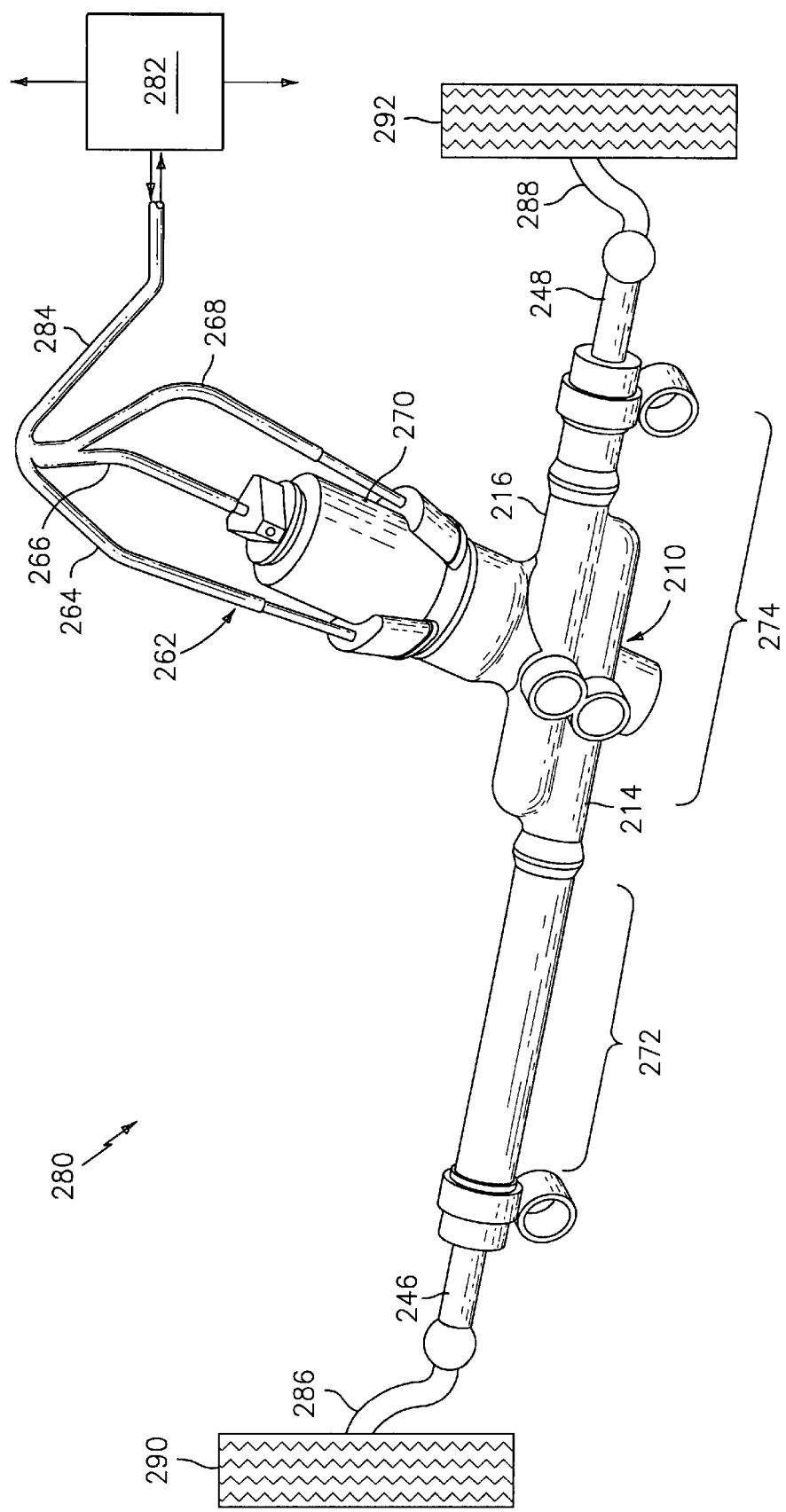
FIG. 6 is a perspective view of the steering rack of FIG. 4 as used in a steer-by-wire system.

One application of a dual variable-tooth rack and single pinion steering system is a steer-by-wire system as shown in FIG. 6. FIG. 6 is a schematic representation of a steer-by-wire steering system 280 generally comprised of a controller 282, and a single electro-mechanical actuator such as the primary electric motor drive 262 in signal communication 284 with the controller 282. The single electro-mechanical actuator 262, typically comprising an electric machine 270, crank arm (not shown), steering arms 286, 288 and tie rods 246, 248, are in turn connected respectively to a first wheel 290 and a second wheel 292 and are operative thereby to turn the wheels 290 and 292 under the command of the controller 282.

In addition, the primary electric motor drive area 262 that is coupled to the electric driving force such as the vehicle battery (not shown) supplying the electric direct current is described. The primary electric motor drive area 262 includes the set of electric leads 264, 266, 268 coupled to the electric machine 270 such as an electric motor. The electric machine 270 includes the rotor (not shown) that is coupled to the shaft (also not shown). The shaft in turn is coupled the pinion gear piece 240 that has the pinion centerline 212. The pinion gear piece 240 in turn is coupled to the dual variable-tooth rack 210. It is pointed out that the dual variable-tooth rack and single pinion steering system teaches a single pinion steering actuator such as the above described pinion gear piece 240 that drives the dual variable-tooth rack 210. This is a significant feature of the described systems. The dual variable-tooth rack 210 in turn is coupled to the first rack 214 and the second rack 216. This application of the dual variable-tooth rack and single pinion steering system has a vehicle operator's side rack area 242 wherein the vehicle operator's side rack area 242 is situated closer to the vehicle operator. The first rack 214 extends substantially through the first side rack area 272 and then is coupled to the front passenger side tie rod 246. The front passenger side tie rod 246 in turn is coupled to the front wheel 290. The second rack 216 extends substantially through the second rack area 274 and then is coupled to the front vehicle operator's side tie rod 248. The tie rod 248 in turn is coupled to another front wheel 292. It is noted that to describe the instant Figure as the first side rack area 272 and the second side rack area 274, instead of vehicle operator side and passenger side, is done because in steer-by-wire systems, which are contemplated in this disclosure, steering columns are no long needed. In other words, the primary electric motor drive area 262 is at a location as described in the instant figure. Optionally, the primary electric motor drive area 262 can be elsewhere, since it need not be on the operator's side of the vehicle.

Figure 7:
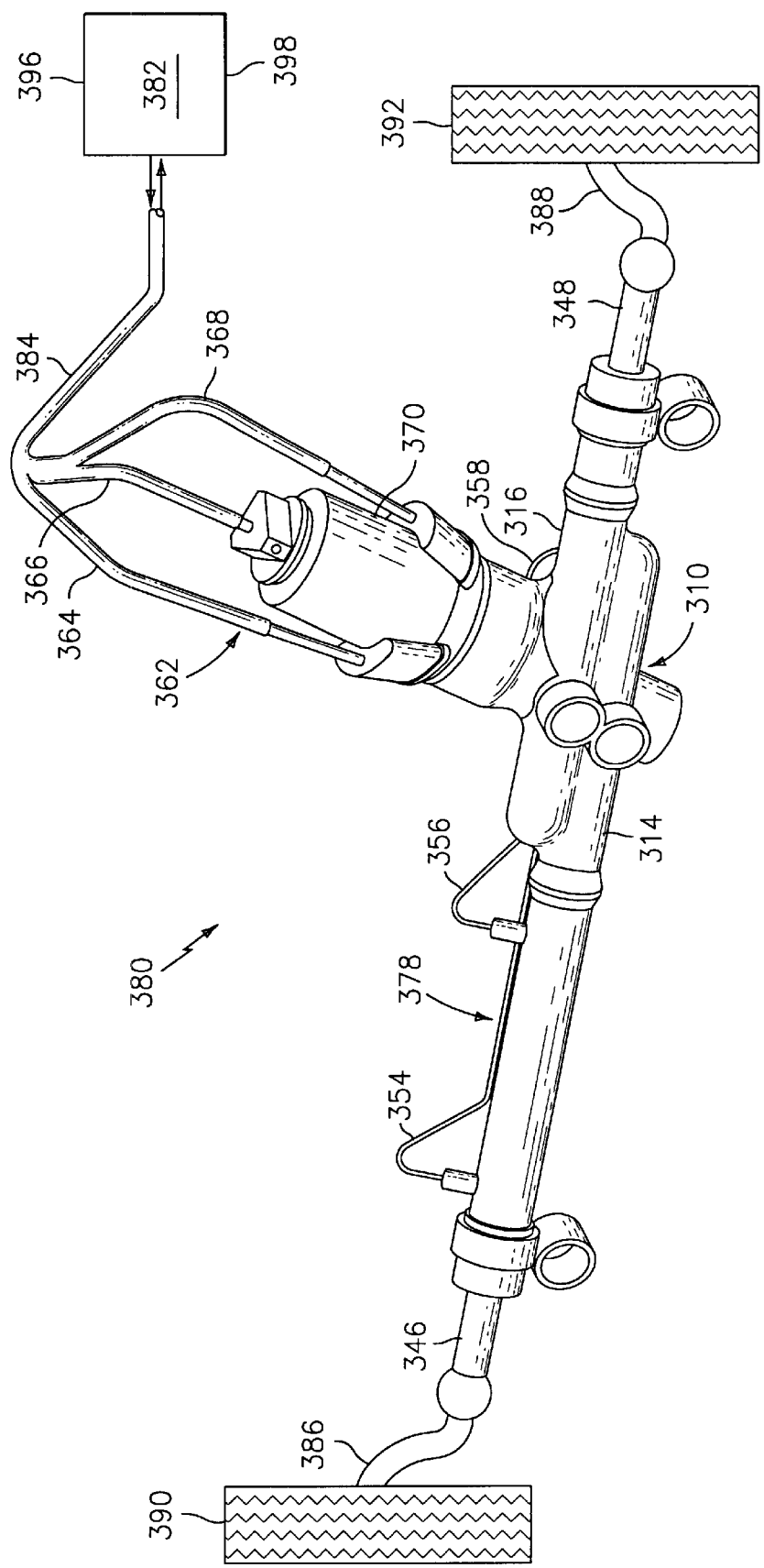
FIG. 7 is a perspective view of the steering rack of FIG. 5 as used in a steer-by-wire system.

Similarly, another application of a dual variable-tooth rack and single pinion steering system is a steer-by-wire system as shown in FIG. 7. This is a schematic representation of a steer-by-wire steering system 380 as it is generally comprised of a controller 382, a single electro-mechanical actuator 362, in signal communication 384 with the controller 382. The single electro-mechanical actuator 362, typically comprising a motor 370, crank arm (not shown), steering arms 386 and 388, and tie rods 346 and 348 that are connected respectively to a first wheel 390 and a second wheel 392, is operative thereby to turn the wheels 390 and 392 under the command of the controller 382. In addition, the primary electric motor drive area 362 that is coupled to the electric driving force such as the vehicle battery (not shown) supplying the electric direct current is described. The primary electric motor drive area 362 includes the set of electric leads 364, 366, 368 coupled to the electric machine 370 such as an electric motor. The electric machine 370 includes the rotor (not shown) that is coupled to the shaft (also not shown). The shaft in turn is coupled the pinion gear piece 340 that has the pinion center-line 312. The pinion gear piece 340 in turn is coupled to the dual variable-tooth rack 310. It is pointed out that the dual variable-tooth rack and single pinion steering system teaches a single pinion steering actuator such as the above described pinion gear piece 340 that drives the dual variable-tooth rack 310. This is the significant feature of the described system. The dual variable-tooth rack 310 in turn is coupled to the first rack 314 and the second rack 316. This application of a dual variable-tooth rack and single pinion steering system has a vehicle operator's side rack area 342 wherein the vehicle operator's side rack area 342 is situated closer to the vehicle operator. The first rack 314 extends substantially through the first side rack area 372 and then is coupled to the front passenger side tie rod 346. The front passenger side tie rod 346 in turn is coupled to the front wheel 390. The second rack 316 extends substantially through the second rack area 374 and then is coupled to the front vehicle operator's side tie rod 348. The tie rod 348 in turn is coupled to another front wheel 392. It is noted that to describe FIG. 7 as the first side rack area 372 and the second side rack area 374 instead of vehicle operator side and passenger side is because in steer-by-wire systems, which is contemplated in this disclosure, steering columns are no long needed. In other words, the primary electric motor drive area 362 is at a location as described in FIG. 7, but can alternatively be located elsewhere.

In addition, a hydraulic backup area 378 is described. The hydraulic backup area 378 includes a subsystem for hydraulic power steering that is generally known in the art. The hydraulic backup area 378 includes control valves 354, 356, 358 that are coupled to the pinion gear piece 340 via hydraulic coupling for control purposes. The pinion gear piece 340 in turn is controlled by primary electric motor drive area 362.

The controller 382 further includes a first lead 396 whereby power such as provided by the battery mentioned above is applied. The controller 382 also includes a second lead 398 whereby the controller communicates with an outside device.

The described embodiment incorporates two steering racks, 314 and 316. Each steering rack has a variable predetermined tooth profile. The two steering racks 314 and 316, mesh with a single pinion. In other words, a preprogrammed differential steering effect can be achieved between right and left front, as well as rear wheels.

A single solid steering rack cannot create steering rack movements as taught in the present disclosure. Furthermore, two separate steering racks that are driven by two electric motors or hydraulic circuits or a vehicle operator input or a combination of the above is undesirably costly. However, the described embodments of a dual variable-tooth rack and single pinion steering system only uses a single pinion, thereby remaining operable with only a single electric motor, hydraulic system, or vehicle operator input, or a combination of the above. It is evident that the savings in cost of parts and part count, as well as physical space, is significant.

Because of the predetermined orientation for each tooth on the racks, such as, for example, racks 14 and 16 of FIG. 1; predetermined variable steering angles between sets of wheels can still be achieved. Furthermore, the reliability or robustness of the described dual variable-tooth rack and single pinion steering system verses a dual actuator system is improved because of the continuous mechanical connection between both steering racks and the pinion.

The steering system embodiments described herein include a first toothed rack that has a first end and a second end. The first toothed rack further has a set of teeth with predetermined variable tooth profile. The steering systems further include a second toothed rack that has a first end and a second end. The second toothed rack further has a set of teeth with predetermined variable tooth profile complimenting the first tooth rack. For example, if the first toothed rack has a tooth profile with a monotonically increasing pitch from a first inner end to a second outer end, the second toothed rack would be positioned with its outer end at an opposite side of the vehicle from the first toothed rack and have a tooth profile with a monotonically increasing pitch from a first inner end to a second outer end.

In addition, the steering system has a pinion disposed to engage the first end of the first tooth rack, as well as disposed to engage the first end of the second toothed rack thereby creating a set of variable steering angles between a set of wheels. A steer-by-wire steering system incorporates the above-described steering system, and further includes an actuator that has a moving member coupled to the pinion whereby the moving member causes the pinion to move. A method for a steering system includes engaging of a single pinion with a first toothed rack that has a set of teeth with predetermined variable tooth profile, as well as simultaneously engaging the single pinion with a second toothed rack that has a set of teeth with a predetermined variable tooth profile, and a turning of the single pinion.

While preferred embodiments have been shown and described, various modifications and substitutions may be made thereto without departing from the spirit and scope of the disclosure. Accordingly, it is to be understood that the present invention has been described by way of illustration only, and such illustrations and embodiments as have been disclosed herein are not to be construed as limiting to the claims.

What is claimed is:

1. A steering system, comprising:
    a first elongated rack having an inner end, an outer end, and a set of teeth with a predetermined variable tooth profile therebetween;
    a second elongated rack having an inner end, an outer end, and a set of teeth with a predetermined variable tooth profile therebetween;
    a pinion disposed to engage the teeth towards the inner end of the first rack and the teeth towards the inner end of the second rack, thereby defining a set of variable steering angles between the outer end of the first rack and the outer end of the second rack; and,
    an actuator having a moving member coupled to the pinion, whereby the moving member causes the pinion to rotate, wherein the actuator comprises an electric machine.

2. The steering system of claim 1 wherein the moving member comprises a rotor of the electric machine.

3. A steering system, comprising:
    a first elongated rack having an inner end, an outer end, and a set of teeth with a predetermined variable tooth profile therebetween;
    a second elongated rack having an inner end, an outer end, and a set of teeth with a predetermined variable tooth profile therebetween;
    a pinion disposed to engage the teeth towards the inner end of the first rack and the teeth towards the inner end of the second rack, thereby defining a set of variable steering angles between the outer end of the first rack and the outer end of the second rack;
    an actuator having a moving member coupled to the pinion, whereby the moving member causes the pinion to rotate; and,
    a controller coupled in signal communication with the actuator.

4. The steering system of claim 3, further comprising a steering wheel coupled in signal communication with the controller.

5. The steering system of claim 4 wherein the steering wheel receives an input command from an operator.

6. A steering system, comprising:
    a first elongated rack having an inner end, an outer end, and a set of teeth with a predetermined variable tooth profile therebetween, the first elongated rack having a first longitudinal axis;
    a second elongated rack having an inner end, an outer end, and a set of teeth with a predetermined variable tooth profile therebetween, the second elongated rack having a second longitudinal axis; and,
    a pinion disposed to engage the teeth towards the inner end of the first rack and the teeth towards the inner end of the second rack, thereby defining a set of variable steering angles between the outer end of the first rack and the outer end of the second rack, the pinion having a centerline parallel to a plane containing the first longitudinal axis and the second longitudinal axis, wherein rotation of the pinion is about the centerline.

7. The steering system of claim 6 wherein the variable tooth profile of the second rack is complimentary to the variable tooth profile of the first rack.

8. The steering system of claim 6 wherein:
    the variable tooth profile of the first rack is monotonically increasing in pitch from its inner end toward its outer end; and
    the variable tooth profile of the second rack is monotonically increasing in pitch from its inner end toward its outer end.

9. The steering system of claim 6 further comprising a hydraulic assist, whereby the hydraulic assist is operably disposed to assist the steering system.

10. The steering system of claim 6 further comprising an electric assist, whereby the electric assist is operably disposed to assist the steering system.

11. The steering system of claim 6 wherein the first elongated rack and the second elongated rack are adjacently disposed.

12. The steering system of claim 6 wherein the teeth of the first elongated rack extend from one side of the first elongated rack to a diametrically opposite side of the first elongated rack.

13. A steering system, comprising:
    a first elongated rack having an inner end, an outer end, and a set of teeth with a predetermined variable tooth profile therebetween;
    a second elongated rack having an inner end, an outer end, and a set of teeth with a predetermined variable tooth profile therebetween;
    a pinion disposed to engage the teeth towards the inner end of the first rack and the teeth towards the inner end of the second rack, thereby defining a set of variable steering angles between the outer end of the first rack and the outer end of the second rack; and,
    an electric assist, wherein the electric assist is operably disposed to assist the steering system.

* * * * *